United States Patent
Metzger

(10) Patent No.: US 9,471,583 B2
(45) Date of Patent: Oct. 18, 2016

(54) DATA RACE ANALYSIS WITH IMPROVED DETECTION FILTERING

(75) Inventor: Markus T. Metzger, Ulm (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/991,433

(22) PCT Filed: Sep. 2, 2011

(86) PCT No.: PCT/IB2011/002029
§ 371 (c)(1),
(2), (4) Date: Jun. 30, 2014

(87) PCT Pub. No.: WO2013/030612
PCT Pub. Date: Mar. 7, 2013

(65) Prior Publication Data
US 2014/0317129 A1    Oct. 23, 2014

(51) Int. Cl.
*G06F 17/30* (2006.01)
*G06F 11/36* (2006.01)

(52) U.S. Cl.
CPC ..... *G06F 17/30144* (2013.01); *G06F 11/3612* (2013.01); *G06F 11/3632* (2013.01)

(58) Field of Classification Search
None
See application file for complete search history.

(56) References Cited

U.S. PATENT DOCUMENTS

| | | | |
|---|---|---|---|
| 6,920,634 B1* | 7/2005 | Tudor | 718/107 |
| 2003/0056149 A1* | 3/2003 | Hue | G06F 9/52 714/38.13 |
| 2003/0236951 A1* | 12/2003 | Choi et al. | 711/150 |
| 2007/0022325 A1* | 1/2007 | Morizawa | G06F 11/3632 714/38.1 |
| 2008/0162776 A1* | 7/2008 | Krauss | 711/100 |
| 2008/0201393 A1* | 8/2008 | Krauss | 707/206 |
| 2008/0244332 A1* | 10/2008 | Edwards et al. | 714/48 |
| 2009/0282288 A1 | 11/2009 | Wang et al. | |
| 2011/0138236 A1* | 6/2011 | Park | G06F 11/0715 714/57 |

FOREIGN PATENT DOCUMENTS

CN    102063328 A    5/2011

OTHER PUBLICATIONS

International Search Report and Written Opinion received for PCT application No. PCT/IB2011/002029, mailed on Jan. 24, 2012, 12 Pages.
"Intel(R) Thread Checker 3.1 for Linux", Document No. 313445-001 US, 2006, pp. 1-9.

(Continued)

*Primary Examiner* — James Trujillo
*Assistant Examiner* — Aida Tessema
(74) *Attorney, Agent, or Firm* — Grossman, Tucker, Perreault & Pfleger, PLLC

(57) ABSTRACT

A method according to one embodiment includes the operations of receiving a list of one or more data race analysis targets, wherein the data race analysis targets comprise at least one of a source file name, source file line, function name, variable name or target address range; generating a data race analysis filter, wherein the data race analysis filter comprises a data structure including memory address ranges based on the list of data race analysis targets; and performing a data race analysis on a memory access, wherein the memory access is associated with memory addresses included in the data race analysis filter.

20 Claims, 3 Drawing Sheets

(56) References Cited

OTHER PUBLICATIONS

Flanagan, et al., "Dynamic Partial-Order Reduction for Model Checking Software", POPL '05 proceedings of the 32nd ACM SIGPLAN-SIGACT Symposium on Principles of Programming Languages, vol. 40, Jan. 12-14, 2005, pp. 110-121.

Savage et al. "Eraser: A Dynamic Data Race Detector for Multithreaded Programs", ACM Transactions on Computer Systems, vol. 15, No. 4, Nov. 1997, pp. 391-411.

Stack, et al., Accurate and Efficient Filtering for the Intel Thread Checker Race Detector, ASID '06, San Jose, California, USA, Oct. 21, 2006, pp. 1-8.

Office Action received for Chinese Application No. 201180073227.3, mailed Aug. 4, 2015, 21 pages of English translation and 11 pages of Chinese Office Action.

International Preliminary Report on Patentability from related application PCT/IB2011/002029 mailed Mar. 4, 3014.

Office Action received for Chinese Application No. 201180073227.3, mailed Apr. 5, 2016.

* cited by examiner

DATA RACE ANALYSIS WITH IMPROVED DETECTION FILTERING

CROSS-REFERENCE TO RELATED APPLICATIONS

This application is a U.S. national stage completion of International Application No. PCT/IB2011/002029 filed Sep. 2, 2011, the entire content of which is herein incorporated by reference.

FIELD

The present disclosure relates to data race analysis, and more particularly, to data race analysis with improved detection filtering.

BACKGROUND

As computer systems grow more complex they increasingly employ multi-threaded programming techniques with large numbers of threads running in parallel. The threads may execute on one or more processors or on different cores within a multi-core processor. Writing a multi-threaded program can be difficult and error prone. Programming mistakes that result in synchronization errors between the threads can produce data race conditions where two or more threads access the same memory address in a non-deterministic way. This can produce varying and/or unpredictable results depending on random timing conditions. Such programming mistakes, while commonly made, are difficult to locate with conventional debugging tools.

Existing methods for detection and location of data race conditions typically involve run-time analysis of the entire program including inspection of every memory access. This can slow down execution speed by factors of 20 to 100 in addition to doubling memory usage. This type of analysis may also generate voluminous data race reports that often require extensive post-analysis filtering to focus on particular areas of interest in order for the analysis results to be manageable. These types of filters can become complex, difficult to maintain and often require further use of automated tools to create and manage. The difficulties are compounded since data race debugging is typically performed in an iterative workflow where the program is analyzed, a data race is detected and fixed, the program is re-compiled and the process is repeated. The overhead associated with this procedure can prevent regular use as part of a daily software build and test cycle.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides methods and systems for implementing run-time data race analysis on multi-threaded programs with increased efficiency using improved detection filtering. These techniques provide capability for a user to target particular areas of interest within a program for data race analysis. The user may specify these target areas by, for example, source file names, line numbers, functions, variables, address ranges, or any other suitable designations. A data race analysis filter may then be generated based on the specified analysis targets. The filter may comprise a data structure including memory address ranges in a form that provides for searching with increased efficiency. The memory address ranges may be non-overlapping memory address ranges. A run-time data race analysis may then be performed with the analysis restricted to memory accesses that are associated with addresses in the analysis filter.

While traditional data race analysis tools perform an analysis on the entire program, this is often not necessary. Some examples where targeted data race analysis may be appropriate include investigating a data race associated with a code fix that is limited to a particular region of the code and/or investigating a symptom that is known to be associated with a particular region of the code.

Figure 1:
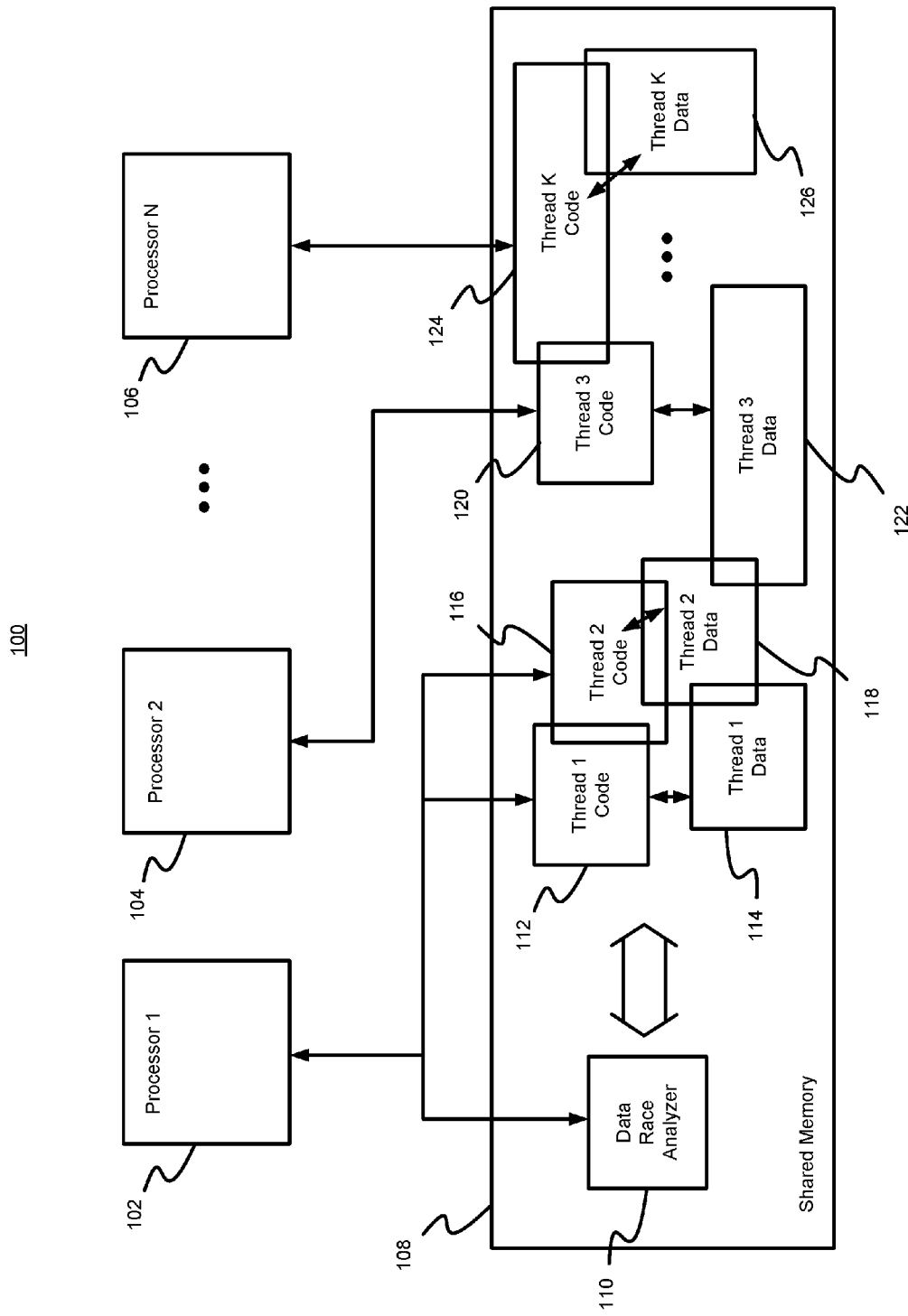
FIG. 1 illustrates a high level system block diagram of one exemplary embodiment consistent with the present disclosure.

FIG. 1 illustrates a high level system block diagram 100 of one exemplary embodiment consistent with the present disclosure. Any number of processors 102, 104, 106 may be configured to share memory 108. In some embodiments, the processors 102, 104, 106 may be separate cores within a multi-core processor configuration. A program to be analyzed for data race conditions may comprise any number of threads, each thread comprising executable thread code 112, 116, 120, 124 and associated thread data 114, 118, 122, 126. Data race analyzer 110 is provided to monitor and analyze selected memory accesses performed by the threads, as will be described in greater detail below.

Each instance of thread code 112, 116, 120, 124 and thread data 114, 118, 122, 126 may occupy a given region of shared memory 108, and these regions may overlap in some instances. For example, thread 2 code 116 may access data in the thread 2 data region 118 which overlaps the thread 1 data region 114 and the thread 3 data region 122 to some extent. This situation may arise, for example, because thread 2 needs to share data with thread 1 and thread 3. Similarly, thread code regions may overlap as, for example, thread 1 code 112 and thread 2 code 116. This may occur, for example, because different threads share common sections of code, or because shared common data may be embedded in the code sections. Thread code from different threads may be executed on the same or on different processors. For example thread 1 code 112 and thread 2 code 116 are both executed on processor 1 102, while thread 3 code 120 is executed on processor 2 104.

In general, when executable code from different threads have unrestricted access to a common memory location, for example a particular data value at a given address in shared memory, the potential exists for conflict in the form of synchronization errors known as a data race condition. This can produce varying and/or unpredictable results depending on random timing conditions. In a simple example, if one thread is writing to a memory address while another thread is reading from that same memory address the result will be different depending on whether the write happens before or after the read. The order of access may be unpredictable since it can depend on the timing of external events, the relative load balance between different processors, or any number of other factors. Various synchronization mechanisms are available to software developers to prevent these problems such as flags, semaphores, locks, events, etc, but they are not always used or used correctly, and in complex programs it can be difficult to eliminate all potential data race conditions.

In an embodiment consistent with the present disclosure, a data race analyzer 110 is provided. The data race analyzer 110 is shown in FIG. 1 as residing in shared memory 108 and being executed by processor 1 102, although this is not necessary. The data race analyzer 110 may be executed by any available processor and may reside in any available memory. In some embodiments the data race analyzer 110 may be implemented as external circuitry, logic, firmware or any other suitable combination of hardware and/or software. Data race analyzer 110 is provided to monitor and analyze selected memory accesses performed by the threads 112, 116, 120, 124 and check for conflicting memory accesses that may result from synchronization errors between the threads, as will be described in greater detail below.

Figure 2:
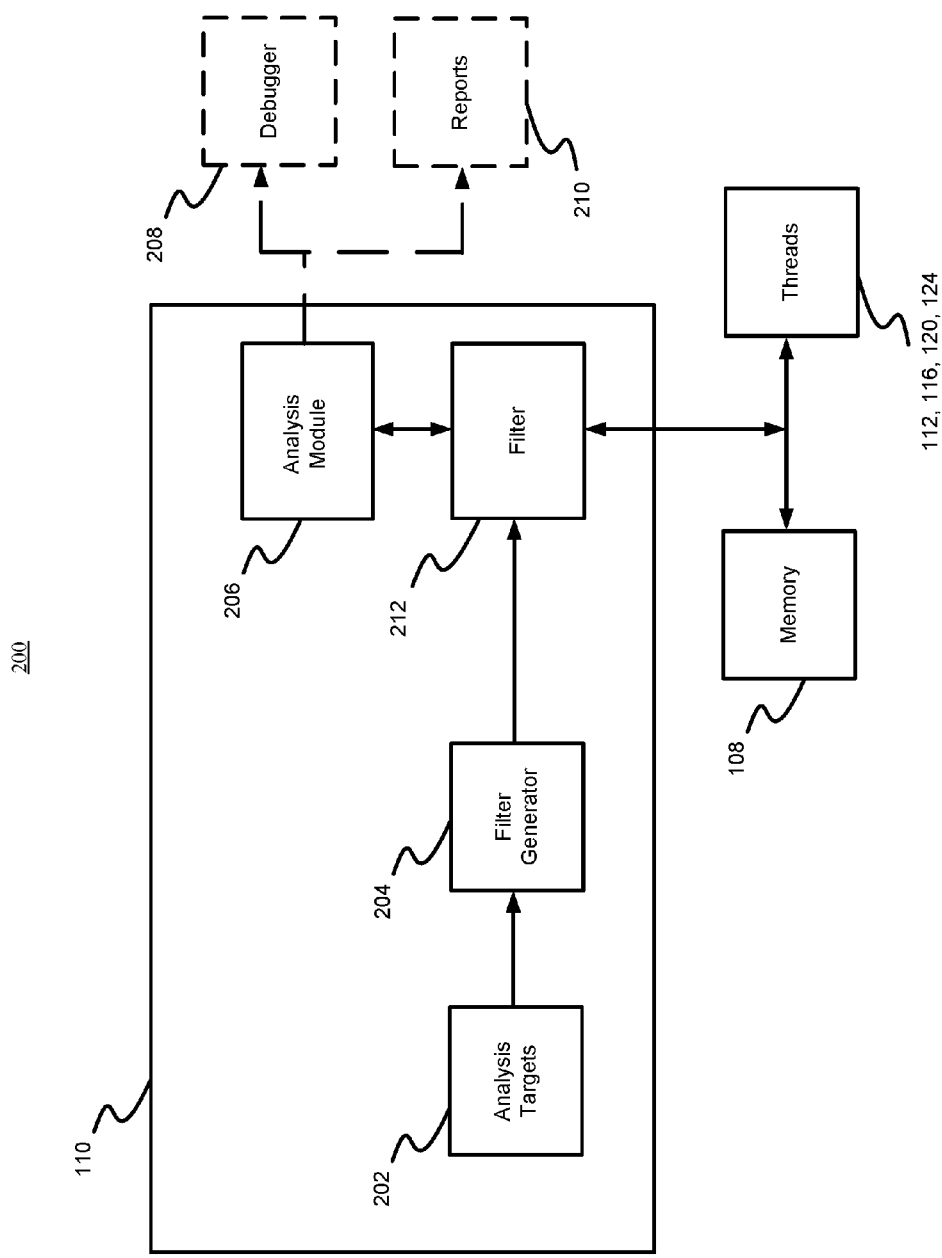
FIG. 2 illustrates one exemplary block diagram of a system comprising a data race analyzer consistent with various embodiments of the present disclosure.

FIG. 2 illustrates one exemplary block diagram 200 of a system comprising data race analyzer 110 consistent with various embodiments of the present disclosure. Analysis targets 202 may be provided by the user to indicate the areas of interest within a program upon which the data race analysis should focus. These targets may include information such as source file names, line numbers, functions, variables, address ranges, or any other suitable information. Global settings may also be specified, such as, for example, a directive to not include memory read accesses in the data race analysis.

Filter generator 204 generates an initial list, based on the analysis targets 202, of all memory addresses in the entire program that are of interest for the data race analysis along with the type of memory access of interest (e.g., read access, write access, or both) along with any other relevant information. In some embodiments, for example, in the case of a source file name and line number target specification, filter generator 204 may search source files for a matching source file name, then search compilands (e.g., the product of the compilation of a source file) to which that source file contributes and then search functions in those compilands, for memory addresses which correspond to the target source file and line number. Similar procedures may be performed, as outlined in the pseudo-code examples below, for obtaining memory addresses for other analysis target specifications. All memory addresses obtained in this manner may then be merged into the initial list of memory addresses of interest.

The initial list may contain duplications of memory addresses and the memory addresses may be in random order depending on how the analysis targets were specified and searched. The filter generator 204 processes that initial list of memory addresses and associated information into a filter 212 to be used during run-time analysis to filter out memory accesses to addresses that are not of interest to the data race analysis.

The filter 212 may be configured by the filter generator 204, based on the initial list, into a format that can be used for run-time analysis of the program threads 112, 116, 120, 124. In some embodiments, that filter format may be a new, compact ordered list of non-overlapping address ranges. Eliminating duplications and ordering the list may result in a filter that can be searched with increased speed during the run-time analysis. In other embodiments, the filter format may be a search tree or other suitable data structure.

Analysis module 206 performs the run-time data race analysis of the threads 112, 116, 120, 124 accessing memory addresses in memory 108. Analysis module 206 monitors these thread memory accesses through filter 212 such that memory accesses from addresses of interest are analyzed. In some embodiments, this may be accomplished by checking that memory access addresses match addresses of interest in an ordered list of non-overlapping addresses in filter 212.

Analysis module 206 may employ any known data race analysis technique on those addresses of interest, such as, for example, "lockset" analysis or "happens-before" analysis. In "lockset" analysis, a check is performed on conflicting memory accesses from different threads to ensure that a synchronization lock exists for that memory address and that the lock is held by the thread that is accessing that memory address. In "happens-before" analysis, a check is performed on conflicting memory accesses from different threads to ensure that the accesses are separated by synchronization events.

Analysis module 206 may optionally execute a debugger 208 or generate reports 210 in response to the detection of data race conditions.

By limiting data race analysis to those memory addresses that are of interest to the user, and by generating and using a filter format that enables the run-time analysis to be limited to those addresses, embodiments of the present disclosure may achieve increased execution speed and decreased memory usage.

Figure 3:
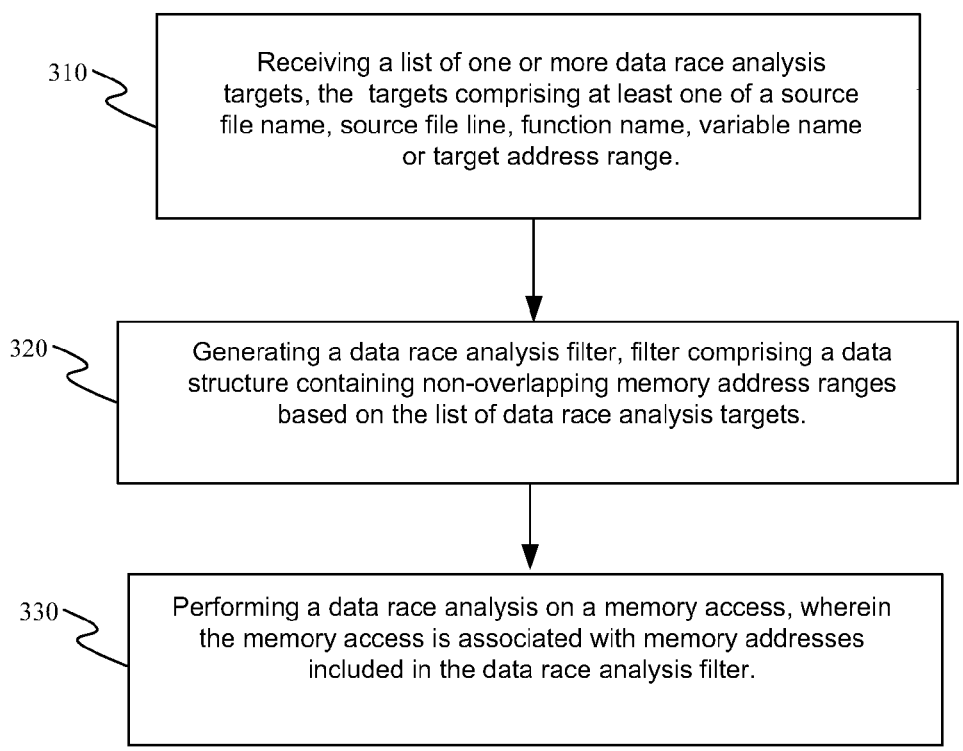
FIG. 3 illustrates a flowchart of operations of another exemplary embodiment consistent with the present disclosure.

FIG. 3 illustrates a flowchart of operations 300 of another exemplary embodiment consistent with the present disclosure. At operation 310, a list of one or more data race analysis targets is received. The data race analysis targets comprise at least one of a source file name, source file line, function name, variable name or target address range. At operation 320, a data race analysis filter is generated. The data race analysis filter comprises a data structure including memory address ranges based on the list of data race analysis targets. In some embodiments, the memory address ranges may be non-overlapping, the data structure may be an ordered list or a search tree, and the filter may specify whether write memory accesses are to be analyzed or both read and write memory accesses are to be analyzed. At operation 330, a data race analysis is performed on a memory access, wherein the memory access is associated with memory addresses included in the data race analysis filter. In some embodiments, a debugger may be executed and/or reports may be generated in response to the detection of a data race condition by the data race analysis.

The following is an illustrative example of one embodiment of a pseudo code consistent with the present disclosure. Lines 1-13 of the pseudo code are operable to generate a working set of addresses based on a source file name specification. Lines 15-28 of the pseudo code are operable to generate a working set of addresses based on a source line specification. Lines 30-43 of the pseudo code are operable to generate a working set of addresses based on a function name specification. Lines 45-58 of the pseudo code are operable to generate a working set of addresses based on a variable name specification. Lines 60-67 of the pseudo code are operable to generate an analyzer filter based on working sets of addresses. Lines 69-81 of the pseudo code are operable to perform a data race analysis using the analyzer filter.

```
// Working Set Generation for Source Files
Input:   source file name
Output: working_set      // set of addresses covered by this source file
working_set = { }
for each debug information source file matching input source file name
    for each compiland this file contributes to
        for each function in that compiland
            for each source location covered by that function
                if the source location is for input source file name
                    for each address covered by that source location
                        if that address maps back to input source file name
                            working_set += { address }
return working_set
// Working Set Generation for Source Lines
Input:   source file name
Input:   source line number
Output: working_set      // set of addresses covered by this source line
working_set = { }
for each debug information source file matching input source file name
    for each compiland this file contributes to
        for each function in that compiland
            for each source location covered by that function
                if the source location is for input source file name and input source line number
                    for each address covered by that source location
                        if that address maps back to input source file name and input source line number
                            working_set += { address }
return working_set
// Working Set Generation for Function Names
Input:   source file name
Input:   function name
Output: working_set      // set of addresses covered by this function
working_set = { }
for each debug information source file matching input source file name
    for each compiland this file contributes to
        for each function in that compiland
            for each source location covered by that function
                if the source location is for input source file name and input function name
                    for each address covered by that source location
                        if that address maps back to input source file name and input function name
                            working_set += { address }
return working_set
// Working Set Generation for Variable Names
Input:   source file name
Input:   variable name
Output: working_set      // set of addresses covered by this variable
working_set = { }
for each debug information source file matching input source file name
    for each compiland this file contributes to
        for each variable in that compiland
            for each source location covered by that variable
                if the source location is for input source file name and input variable name
                    for each address covered by that source location
                        working_set += { address }
return working_set
// Analyzer Filter Generation
Input:   analysis configuration specification
Output: analyzer filter
for each analysis configuration specification
    select and execute appropriate working set generation function
    merge returned working_set into compact, non-overlapping, ordered list of addresses
analyzer filter = merged list of addresses
return analyzer filter
// Data Race Analyzer
Input:   analyzer filter
input:   code address of memory access
input:   data address of memory access
input:   size of memory access
analyze flag = false
if code address is in filter
    analyze flag = true
else
    if data address range [data address to data address+size] is in filter
        analyze flag = true
if analyze flag = true
    perform data race detection on the address or address range
```

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor)

and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method, comprising:
   receiving a list of two or more data race analysis targets for a computer program, wherein said data race analysis targets comprise at least one of a source file name, source file line, function name, or variable name;
   generating a data race filter for each of said received data race analysis targets, wherein generating said data race filter set includes:
     determining compilands for each of said two or more data race analysis targets;
     determining functions contained within each of said compilands;
     determining memory address ranges for each function contained within each of said compilands;
     removing duplicate memory addresses contained within each of said memory address ranges; and
     merging said memory address ranges into a merged list;
   in response to generating said data race filter, performing a runtime analysis on said computer program using said data race filter, said run time analysis includes:
     identifying a memory access at a memory address; and
     searching said merged list for said memory address; and
   in response to said memory address being in said merged list, performing a data race analysis on said memory access.

2. The method of claim 1, wherein said data race filter is an ordered list.

3. The method of claim 1, wherein said data race filter is a search tree.

4. The method of claim 1, wherein said memory address ranges are non-overlapping.

5. The method of claim 1, wherein said data race filter further comprises an indication that said memory access is a write memory access, wherein said indication applies to at least one of said memory address ranges.

6. The method of claim 1, wherein said memory address is associated with data.

7. The method of claim 1, wherein said memory address is associated with code.

8. The method of claim 1, further comprising executing a debugger in response to said data race analysis detecting a data race condition.

9. A non-transitory computer-readable storage medium having instructions stored thereon which when executed by a processor result in the following operations comprising:
   receiving a list of two or more data race analysis targets for a computer program, wherein said data race analysis targets comprise at least one of a source file name, source file line, function name, or variable name;
   generating a data race filter for each of said received data race analysis targets, wherein generating said data race filter set includes:
     determining compilands for each of said two or more data race analysis targets;
     determining functions contained within each of said compilands;
     determining memory address ranges for each function contained within each of said compilands;
     removing duplicate memory addresses contained within each of said memory address ranges; and
     merging said memory address ranges into a merged list;
   in response to generating said data race filter, performing a runtime analysis on said computer program using said data race filter, said run time analysis includes:
     identifying a memory access at a memory address; and
     searching said merged list for said memory address; and
   in response to said memory address being in said merged list, performing a data race analysis on said memory access.

10. The non-transitory computer-readable storage medium of claim 9, wherein said data race filter is an ordered list.

11. The non-transitory computer-readable storage medium of claim 9, wherein said memory address ranges are non-overlapping.

12. The non-transitory computer-readable storage medium of claim 9, wherein said data race filter further comprises an indication that said memory access is a write memory access, wherein said indication applies to at least one of said memory address ranges.

13. The non-transitory computer-readable storage medium of claim 9, wherein said memory address is associated with data.

14. The non-transitory computer-readable storage medium of claim 9, wherein said memory address is associated with code.

15. The non-transitory computer-readable storage medium of claim 9, further comprising executing a debugger in response to said data race analysis detecting a data race condition.

16. A system, comprising:
a processor;
a memory configured to host analysis code to be executed on said processor, wherein when said analysis code is executed on said processor said data race analysis code causes said processor to:
receive a list of two or more data race analysis targets for a computer program, wherein said data race analysis targets comprise at least one of a source file name, source file line, function name, or variable name;
generate a data race filter for each of said received data race analysis targets, wherein generating said data race filter set includes:
  determining compilands for each of said two or more data race analysis targets;
  determining functions contained within each of said compilands;
  determining memory address ranges for each function contained within each of said compilands;
  removing duplicate memory addresses contained within each of said memory address ranges; and
  merging said memory address ranges into a merged list;
in response to generating said data race filter, performing a runtime analysis on said computer program using said data race filter, said run time analysis includes:
  identifying a memory access at a memory address; and
  searching said merged list for said memory address; and
in response to said memory address being in said merged list, perform a data race analysis on said memory access.

17. The system of claim 16, wherein said data race filter is an ordered list.

18. The system of claim 16, wherein said data race analysis filter further comprises an indication that said memory access is a write memory access, wherein said indication applies to at least one of said memory address ranges.

19. The system of claim 16, wherein memory address is associated with data.

20. The system of claim 16, wherein said memory address is associated with code.

* * * * *